United States Patent [19]

Fetcenko et al.

[11] Patent Number: 5,135,589
[45] Date of Patent: Aug. 4, 1992

[54] METASTABLE HYDROGEN STORAGE ALLOY MATERIAL

[76] Inventors: Michael A. Fetcenko, 429 Daylily Ct., Rochester Hills; Stanford R. Ovshinsky, 2700 Squirrel Road, Bloomfield Hills, both of Mich. 48063

[21] Appl. No.: 509,524

[22] Filed: Apr. 16, 1990

[51] Int. Cl.$^5$ .............................................. C22C 30/00
[52] U.S. Cl. ................................... 148/442; 420/588; 420/900
[58] Field of Search ................ 148/403, 442; 420/588, 420/900

[56] References Cited

U.S. PATENT DOCUMENTS 4,728,586  3/1988  Venkatesan et al. ............... 420/900

Primary Examiner—R. Dean
Assistant Examiner—Margery S. Phipps

[57] ABSTRACT

Disclosed is an improved metastable, multi-component, multi-phase hydrogen storage alloy material formed by rapid solidifcation from a melt. The improved metastable hydrogen storage alloy is characterized by a refined grain size of approximately 1 micron or less, and the reduction, or elimination of deleterious phases.

The microstructure of the alloy is relatively disordered, and each phase of the material comprises less than 50 atomic percent vanadium and chromium combined. The nominal composition is:

$$V_{y'-y}Ni_yTi_{x'-x}Zr_xCr_x$$

wherein x' is between 1.8 and 2.2; x is between 0 and 1.5; y' is between 3.6 and 4.4; y is between 0.6 and 3.5; and z is between 0 and 1.44.

22 Claims, 4 Drawing Sheets

METASTABLE HYDROGEN STORAGE ALLOY MATERIAL

FIELD OF THE INVENTION

The present invention relates to rechargeable electrochemical cells and rechargeable batteries employing a metal-hydride, hydrogen storage alloy negative electrode. The present invention more particularly relates to multi-component, multiphase hydrogen storage alloy materials fabricated by rapid solidification from a melt, said materials including at least titanium, zirconium, nickel, vanadium and chromium and having relatively small grain size and reduced properties of phases containing high concentrations of vanadium and chromium combined. Hydrogen storage alloy materials possessing these characteristics demonstrate significantly enhanced electrochemical performance vis-a-vis their prior art counterparts.

BACKGROUND OF THE INVENTION

Secondary cells using rechargeable hydrogen storage negative electrodes are an environmentally non-threatening, high energy density electrochemical power source. These cells operate in a different manner than lead acid, nickel-cadmium or other battery systems. The rechargeable hydrogen storage electrochemical cell or battery utilizes a negative electrode that is capable of reversibly electrochemically storing hydrogen. These cells usually employ a positive electrode of nickel hydroxide material, although other positive materials may be used. The negative and positive electrodes are spaced apart in an alkaline electrolyte, which may include a suitable separator, i.e., a membrane, therebetween.

Upon application of an electrical potential across the cell, the negative electrode material (M) is charged by the electrochemical absorption of hydrogen and the electrochemical evolution of hydroxyl ion:

$M + H_2O + e^- \rightarrow M-H + OH^-$ (Charging)

Upon discharge, the stored hydrogen is released to form a water molecule and evolve an electron:

$M-H + OH^- \rightarrow M + H_2O + e^-$ (Discharging)

In the reversible (secondary) cells of the invention, the reactions are reversible.

The reactions that take place at the positive electrode of a secondary cell are also reversible. For example, the reactions at a conventional nickel hydroxide positive electrode as utilized in a hydrogen rechargeable secondary cell are:

$Ni(OH)_2 + OH^- \rightarrow NiOOH + H_2O + e^-$ (Charging), $NiOOH + H_2O + e^- \rightarrow Ni(OH)_2 + OH^-$ (Discharging).

A secondary cell utilizing an electrochemically rechargeable hydrogen storage negative electrode offers important advantages over conventional secondary cells and batteries, e.g., nickel-cadmium cells, lead-acid cells, and lithium cells. First, the hydrogen storage secondary cells contain neither cadmium nor lead nor lithium; as such they do not present a consumer safety or environmental hazard. Second, electrochemical cells with hydrogen storage negative electrodes offer significantly higher specific charge capacities than do cells with lead or cadmium negative electrodes. As a result, a higher energy density is possible with hydrogen storage cells than with conventional systems, making hydrogen storage cells particularly suitable for many commercial applications.

A number of different hydrogen alloy systems have been proposed for use in nickel-metal hydride hydrogen storage electrochemical cells. One such system is the $AB_2$-type hydrogen storage alloy characterized by $C_{14}$ and $C_{15}$ type Laves phase crystalline microstructures. Materials of this type are further characterized by large grain sizes occurring naturally under conventional solidification processes. These materials typically comprise one or more of titanium, zirconium and hafnium and nickel plus one or more additional metals. It is interesting to note that the earliest teaching of $AB_2$-type hydrogen storage alloy materials are, as is the case for many of hydrogen storage systems, directed to thermal hydrogen storage alloys. In thermal hydrogen storage alloys, driving forces for hydriding and dehydriding are thermal and pressure the driving forces. By way of contrast, electrochemical hydrogen storage alloys are charged and discharged by an electron transfer process in ionic media.

A number of different practitioners in the hydrogen storage alloy material art have published extensive amounts of literature in the area of $AB_2$-type hydrogen storage alloy materials. While the bulk of this work is directed to thermal hydrogen storage alloys, extensive teaching of prior art Laves phase type electrochemical hydrogen storage alloys are shown, for example, in Matsushita Electric Industrial Company, Ltd. laid-open European patent application 0-293 660 based on European patent application 88107839.8, filed May 16, 1988 and claiming priority to Japanese patent applications 87/119411, 87/190698, 87/205683, 87/21698, and 87/258889. The teaching of these applications is collectively presented in Japanese patent 89-102855 issued Apr. 20, 1989 to Moriwaki, et al entitled "HYDROGEN STORAGE ALLOY ELECTRODE" issued on Japanese patent application 87JP-258889, filed Oct. 14, 1987. This patent discloses multidimensional hydrogen storage alloys and their hydrides. The alloys are disclosed to be $C_{15}$, Laves phase type materials, which materials have the chemical formula expressed by $A_x B_y Ni_z$ where A is zirconium either alone or with one or more of titanium and hafnium, the titanium or hafnium being 30 atomic percent or less; x equals 1.0; B is at least one of the elements niobium, chromium, molybdenum, manganese, iron, cobalt, copper, aluminum and rare earths elements such as lanthanum and cerium; y is between 0.5 and 1.0; z is between 1.0 and 1.5 and the sum of y plus z equals 1.5 to 2.5.

Moriwaki, et al disclose that this composition enhances the hydrogen storing ability of the alloy and suppresses the loss of discharge capacity which occurs after repeated charging-discharge cycling (cycle life) of titanium-nickel and zirconium-nickel binary systems.

The teaching of the $C_{14}$ and $C_{15}$ type materials is noteworthy because processing conditions are frequently specified to include standard cooling rates and even annealing steps so as to produce alloys having stable microstructures. Additional $AB_2$ type materials are disclosed in, for example, Japanese patent numbers 63-284758, 89-035863, 89-048370, 89-060961. It is important to note that the teaching of each of these cases is deficient with regard to the invention disclosed hereinbelow and that one or more of the key elements taught herein is missing, for example, a teaching which is deficient in each of said above references is that of preferred microstructure and optimum grain size. Further, it is important to note that each of said references is selective or limited to very specific compound which compounds do not disclose, teach or suggest the hydrogen storage alloy material taught herein.

Another suitable class of electrochemical hydrogen storage alloys are the titanium, vanadium, zirconium, and nickel (Ti-V-Zr-Ni) type active materials for the negative electrodes of electrochemical cells. These materials are disclosed in, for example, commonly assigned U.S. Pat. Nos. 4,551,400 to Sapru, Hong, Fetcenko and Venkatesan and 4,728,586 to Venkatesan, Reichman and Fetcenko, the disclosures of which are incorporated herein by reference. The '586 patent of Venkatesan, et al, entitled "ENHANCED CHARGE RETENTION ELECTROCHEMICAL HYDROGEN STORAGE ALLOYS AND AN ENHANCED CHARGE RETENTION ELECTROCHEMICAL CELL" describes a specific sub-class of titanium, vanadium, nickel, zirconium, hydrogen storage alloys comprising titanium, vanadium, zirconium, nickel and a fifth component, particular by chromium. In the preferred exemplification of Venkatesan, et al, the hydrogen storage alloy material has the composition:

$$Ti_{0.33-x}Zr_xV_{0.67-y}Ni_y)_{1-z}Cr_z$$

where x is from 0.0 to 0.25, y is from 0.1 to 0.6 and z is an effective amount between 0.00 and 0.20.

It is important to note that in the '586 patent, the two critical parameters taught hereinbelow are lacking. More specifically, in the '586 patent the average grain size of the material therein is on the order of approximately 10 to 30 microns. Additionally, perhaps more importantly, is the presence of at least one phase in the multiphase, multi-component material which comprises greater than 50 percent vanadium and chromium combined. Indeed, in most cases this heavy V-Cr phase comprises greater than 70 percent vanadium and chromium. The instant inventors have found that multiphase, multi-component materials having larger grain sizes and a heavy vanadium-chromium phase, while displaying excellent charge retention characteristics, also display diminished cycle life capabilities. It is to be particularly noted that the disclosure of the '586 patent specifically recites the presence of the heavy V-Cr phase, and large grain sizes which distinguish it from the teaching of the instant invention.

It is a feature of the instant invention that the hydrogen storage alloy materials, in order to possess a requisite small grain size and reduce the amount or substantially eliminate the presence of the heavy vanadium-chromium phase, be fabricated by rapid solidification from a melt.

The use of fabrication techniques wherein a hydrogen storage alloy material are made by rapid solidification from the melt is disclosed in commonly assigned U.S. Pat. No. 4,637,967 to Keem, et al for "ELECTRODES MADE WITH DISORDERED ACTIVE MATERIAL AND METHODS OF MAKING THE SAME" the disclosure of which is incorporated herein by reference. Keem, et al teach the fabrication of a self supporting, non-particulate dimensionally anisotropic, amorphous negative electrode for use in an electrochemical cell comprising at least titanium, nickel and one element selected from the group of aluminum, boron, chromium, cobalt, hafnium, indium, lead, magnesium, molybdenum, niobium, palladium, tin, zirconium, tin, zirconium and rare earth metals is fabricated. As used by Keem, et al self supporting means a ribbon of electrode fabricated by the direct rapid solidification from a melt of hydrogen storage alloy material, which ribbon is directly employed as the negative electrode without subsequent processing steps. Thus, the Keem, et al reference while pertinent generally to the field of rapid solidification from a melt in hydrogen storage materials, fails to teach a five component alloy including Ti-Zr-V-Ni-Cr and further is limited to a self supporting, amorphous structure. As is well-known in the rapid solidification art, materials formed by rapid solidification are typically substantially non porous. Given that electrochemical reactions, such as those which take place in an electrochemical cell, are generally surface reactions, i.e., heavily dependent upon the surface area and surface character of the electrodes, such non-porous, non-particulate electrodes such as those taught by Keem, et al. are in fact undesirable in many electrochemical applications. Further, given a continuous amorphous structure throughout, the surface area and surface conditions of said electrodes are quite poor for purposes of electron transfer in an electrochemical cell. Therefore, the teaching of the Keem, et al reference, in fact, leads one of ordinary skill in the battery art away from employing the rapid solidification from a melt since the resulting electrode typically results in a electrode ribbon possessing characteristics which are undesirable for electrochemical reactions.

Accordingly, it can be seen that there is a need for a particulate, porous, multi-component, multiphase hydrogen storage alloy material fabricated so said multiphase material does not possess heavy amounts of the predominantly vanadium chromium phase and further so that said material is characterized by relatively small grain sizes therein.

SUMMARY OF THE INVENTION

The improved porous metastable multi-component, multiphase hydrogen storage alloy material disclosed and claimed herein is adapted for use in rechargeable electrochemical cell. The improved electrochemical, hydrogen storage alloy material disclosed herein is also adapted for use in an electrode used in an electrochemical cell. The invention disclosed herein demonstrates that subtle changes in the local chemical and microstructural order of the hydrogen storage alloy material can have significant effects on the electrochemical properties of negative electrodes incorporating these hydrogen storage alloys. According to the invention, the subtle interactions of individual metallic substituents, and the microstructural makeup of the multiphase material are engineered to maximize the desirable electrochemical properties of the hydrogen storage alloy, while minimizing deleterious electrochemical properties thereof.

Preferably, the disordered material disclosed herein includes titanium, nickel, vanadium, zirconium and chromium. The enhanced alloys are formed by rapid solidification from a melt wherein the multiphase material resulting therefrom has a refined grain size and wherein the polycrystalline structure is characterized by refined grain size averaging approximately one micron or less. The improved hydrogen storage alloy is further characterized in that each phase of the multiphase material comprises less than 50 atomic percent vanadium and chromium combined. Each of these characteristics are significant departures from the properties of the multi-component materials discussed hereinabove, and hence account for the significantly enhanced electrochemical properties. A more precise theoretical understanding of how the electrochemical properties are enhanced is presented in greater detail hereinbelow.

The improved metastable multi-component, multiphase hydrogen storage alloy has the nominal composition $$V_{y'-y}Ni_yTi_{x'-x}Zr_xCr_z$$

where an $x'$ is between 1.8 and 2.2, x is between 0 and 1.5; $y'$ is between 3.6 and 4.4, y is between 0.6 and 3.5; and z is an effective amount between 0 and 1.44. Examples of specific metastable multi-component, multiphase hydrogen storage alloy materials include: $V_{22}Ti_{16}Zr_{1.6}Ni_{39}Cr_7$; $V_{25}Ti_{17}Zr_{16}Ni_{40}Cr_2$; $V_{33}Ti_{13}Zr_{14}Ni_{53}Cr_7$; $V_{25}Ti_{17}Zr_{16}Ni_{40}Cr_2$; and $V_{25}Ti_{17}Zr_{15}Ni_{40}Cr_4$. As is mentioned hereinabove, it is a characteristic of the instant invention that no one phase of the multiphase metastable hydrogen storage material is characterized by concentrations of vanadium and chromium combined in excess of 50 percent.

This is in sharp contradistinction to prior art hydrogen storage alloy materials including chromium and vanadium wherein these two elements are present in at least one phase in concentrations upwards of 70 percent. Further, the grain size of the average grain of material in the hydrogen storage alloy is reduced from approximately 10 to 30 microns down to one micron or less.

While not wishing to be bound by theory, the instant inventors believe that the hydrogen storage element, vanadium, is more evenly distributed throughout the hydrogen storage alloy material and thus enhances the storage and release of hydrogen. Alternatively, in prior art hydrogen storage alloy materials large amounts of vanadium were trapped inside of the large agglomerations of vanadium and chromium, and thus were not readily accessible for effectively storing and releasing hydrogen. Further, since the average grain size of the hydrogen storage alloy material is smaller, vanadium, the hydrogen storage element is more evenly distributed through the surrounding hydrogen storage catalyst, nickel, and therefore the hydrogen storage/release mechanism is considerably more effective. Finally, the large agglomerations of vanadium and chromium renders the vanadium much less electrochemically active; the result is a higher susceptibility to oxidation and corrosion which reduces the mechanical integrity of the hydrogen storage alloy material, and hence material cycle life and discharge rate capability. The result of this improved hydrogen storage alloy material is a negative electrode material which demonstrates enhanced cycle life performance.

The present also provides an electrochemical cell which includes at least one electrode means for storing energy in a form of hydrogen. The electrode means is formed from a relatively disordered active materials such as that disclosed hereinabove. It also includes at least one counter electrode means providing for release of energy stored in electrode means. The counter electrode means positioned in the cell and spaced in operative contact with the electrode means. The cell also includes a casing having the electrode means and counter electrode means positioned therein.

BRIEF DESCRIPTION OF THE DRAWINGS

FIGS. 3a and 3b illustrate cycle life performance of two cells fabricated by conventional melt/cool processes, while FIGS. 3c and 3d illustrate cycle life performance for cells employing the inventive hydrogen storage alloy materials fabricated by a melt spin process.

DETAILED DESCRIPTION OF THE INVENTION

In accordance with the present invention, there is provided an improved, multiphase, multi-component, metastable hydrogen storage alloy material, formed by rapid solidification from a melt (quenched), derived from the Ti-Zr-V-Ni-Cr alloys of Venkatesan, et al, in which, as compared to conventional alloy solidification processes: 1) the grain size of the material is refined and reduced; 2) a more disordered microstructure is provided; and 3) the elimination of deleterious phases is achieved. The alloy disclosed herein has the nominal composition:

$$V_{y'-y}Ni_yTi_{x'-x}Zr_xCr_z$$

wherein $x'$ is between 1.8 and 2.2, x is between 0.0 and 1.5; $y'$ is between 3.6 and 4.4, y is between 0.6 and 3.5; and z is an effective amount between 0.0 and 1.44.

While the above described material is generally of the same class as those of the Venkatesan, et al reference, the critical distinction between the materials is found in the microstructure and phase composition. More particularly, the instant inventors have found that by fabricating said materials by rapid solidification from a melt onto a rotating chill wheel, they are able to control the microstructure of the material, yielding a smaller grain size which produces a less ordered, more homogenous alloy. Further, since the alloy is quenched from the molten phase to a solid very rapidly (i.e. $10^{6°}$ C./minute) certain phase which occur in conventional melting are not allowed to precipitate. This is particularly true with respect to a phase rich in vanadium:-chromium, (i.e., upwards of 50% V-Cr and often as much as 90% or more). The presence of this phase has been found to deleteriously affect the electrochemical performance of the V-Ti-Zr-Ni-Cr material, particularly the cycle life characteristics and discharge rate capability.

Though not wishing to be bound by this or any particular theory, it is believed that enhanced electrochemical performance, particularly cycle life and rate capability is obtained through improved hydride function. More particularly, discharge rate capability, which can be measured as the voltage of the cell under a given set of conditions, is enhanced because V, which is a hydride forming element, (as is Ti and Zr, while Ni is a catalyst), is no longer concentrated in agglomerations of the V-Cr phase. Thus while the V-Cr phase can store large quantities of hydrogen, it is severely rate dependent due to the fact that concentration of the Ni catalyst are very low in the V-Cr phase.

Figure 1A:
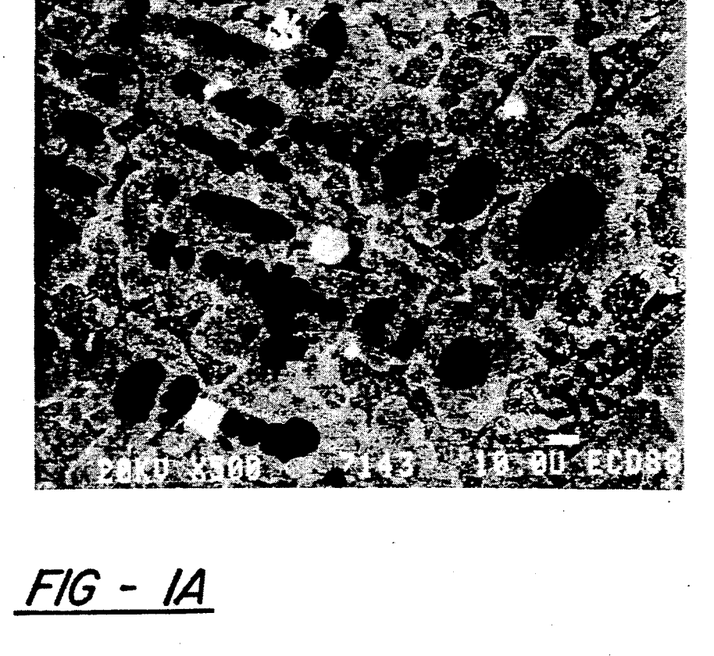
FIGS. 1a and 1b illustrate respectively, scanning electron micrographs of Ti-V-Ni-Zr-Cr hydrogen storage alloys found by conventional melt/cool and rapid solidification.

The difference in phase composition and microstructure between the V-Ti-Zr-Ni-Cr alloy formed by rapid solidification versus conventional alloy formation is dramatically illustrated in FIG. 1. More particularly, FIG. 1a depicts a scanning election micrograph of the V-Ti-Zr-Ni-Cr material formed by a conventional vacuum induction melt. Prominently visible in FIG. 1a is a phase which appears as large dark inclusion 1a, 1b and 1c which contains heavy concentrations of V-Cr. In fact, the base composition of these inclusions is, for example:

$$V_{64.0} Cr_{25.6} Ni_{6.1} Ti_{3.6} Zr_{0.7}$$

As may be appreciated, considerable amounts of V are included in this phase, effectively inhibiting the rate capability of the storing hydrogen. Further, since the V is relatively inactive as a hydrogen storage element, it becomes considerably more susceptible to damage from increased oxidation and corrosion.

Figure 1B:
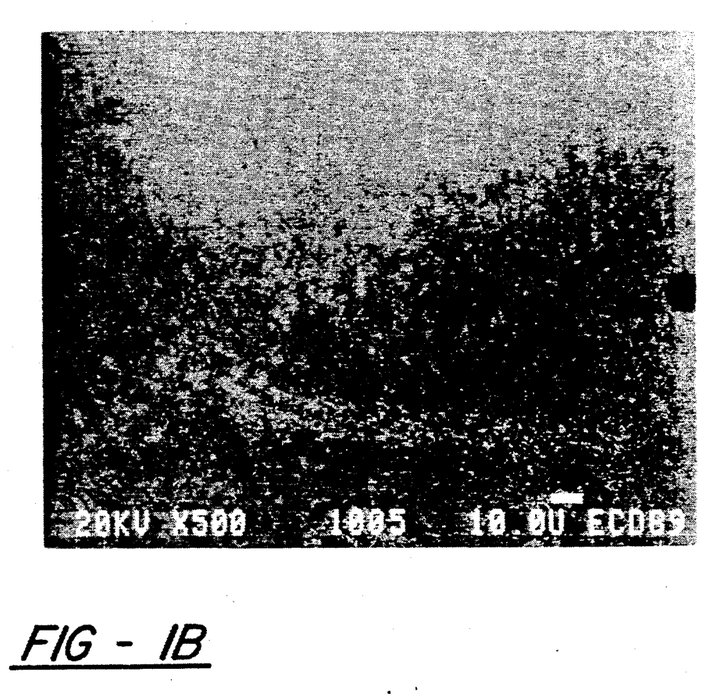

Referring now to FIG. 1b, there is illustrated therein a scanning electron micrograph of the V-Ti-Zr-Ni-Cr alloy material formed by rapid solidification from a melt. It should be immediately apparent that the heavy V-Cr phase prevalent in the conventionally formed alloy shown in FIG. 1 has been eliminated from the alloy. Again, while not wishing to be bound by theory, the instant inventors believe that the rapid quench of the molten alloy prevents the V-Cr phase from precipitating out of the molten state as occurs in a slower, conventional cooling process.

It is additionally important to note that since the microstructure of the alloy has been refined, i.e., the average grain size is reduced from approximately 10–30 microns to one micron or less, the quality of the alloy is more homogenous, more disordered, and the V is more uniformly distributed through the catalyst phases enriched with Ni providing enhanced hydrogen storage utilization. This characteristic is a result of the rapid solidification which promotes a more metastable and disordered microstructure, which is to say that the constituent elements are more uniformly blended into the hydrogen storage matrix. This more refined microstructure and greater homogeneity are readily apparent from a perusal of FIGS. 1a and 1b. The discharge rate capability is enhanced in the inventive alloys disclosed herein by improved hydrogen bulk diffusion, i.e., more efficient mobility of hydrogen through the bulk of the alloy. This increased hydrogen mobility is as a result of the improved grain boundaries and improved homogeneity of the alloy allowing for enhanced catalytic effect. Also, the more metastable, disordered structure is preferred for catalysis of the discharge reaction by alteration of electronic bonding, modification of the surface oxide and greater site defects.

To summarize, enhanced discharge rate capability results because the hydrogen storage phase (V-Cr) is, in effect, combined into the hydride forming catalyst phase (Ni) in a more refined, uniform microstructure. This results in improved catalytic activity and enhanced hydrogen bulk diffusion, yielding greater discharge rate capability. This rapid solidification produced alloy also exhibits phase compositions which more closely resemble the intended average bulk composition of the alloy, rather than demonstrating the more segregated microstructure prevalent in conventional melting processes. The improved rate capability is further characterized by lower internal resistance, higher mid-point voltage during discharge and higher voltage during low temperatures discharge.

As noted hereinabove, cycle life is a particularly important parameter for a rechargeable nickel-metal hydride hydrogen storage cell. Cycle life is defined as the number of charge/discharge cycles that a battery can be subjected to under a given set of conditions to a defined cutoff point. The cutoff point is usually a desired capacity expressed as a stated percentage of original capacity.

Many parameters relating to the metal hydride electrode can influence overall cycle life in a sealed cell with a Ni hydroxide positive electrode. For example, it is critical that the hydrogen storage alloy material maintain mechanical integrity, when compacted into the negative electrode configuration, upon repeated charge/discharge cycling. This is important because prior art alloys provide higher surface area through a cracking phenomena, which cracking compromises structural integrity. The cracking phenomena is substantially eliminated by the inventive alloys disclosed herein because the refined grain boundaries and microstructure work synergistically to improve metallurgical strength during repeated charge/discharge cycling.

Another important parameter related to cycle life characteristics is generally referred to as "oxidation." Generally, oxidation can adversely affect cycle life in many ways. A build-up of oxides on the metal hydride material formed as the negative electrode can reduce charging efficiency; raising internal pressure levels possibly to the degree of vent release, resulting in a loss of electrolyte, and thereby in an impaired state of electrode charge. Oxidation also causes lowered electrode capacity by effectively insulating portions of alloy in the electrode from actively participating in the electrochemical reactions, thus rendering that alloy electrochemically inactive. Oxidation can also affect charge balance in the cell. Formation of metal oxides from water or hydroxyl ion can decrease electrolyte amount, liberate hydrogen gas, or decrease electrolyte concentration. Buildup of surface oxide substantially increases the polarization of the metal hydride electrode, causing an undesirable decrease in voltage on discharge, and an increase in charging voltage. Some of the metal oxides which form upon reaction with the electrolyte or during oxygen recombination are soluble or can form precipitates. This is undesirable. Vanadium, for example, has been proven to be easily soluble, and able to form redox shuttle mechanisms, thereby increasing self discharge. Further, oxides which are less soluble, such as $TiO_2$ and $ZrO_2$ can precipitate at the positive electrode thereby reducing charging efficiency of the nickel-hydroxide electrode.

Though not wishing to bound by theory, the rapid solidification process appears to improve cycle life by improved oxidation/corrosion resistance. This improvement in oxidation/corrosion resistance is brought about due solely to the refined metastable microstructure of the hydrogen storage alloy and the elimination of deleterious alloy phases. It is believed that the refined grain boundaries allow for a greater number of catalytic sites. These catalytic sites in turn provide for more efficient $O_2$ recombinations and hence reduced oxide formation. Additionally, the more disordered microstructure and enhanced homogeneity of the alloy allow for more efficient catalysis and hence better hydrogen oxidation. Further, this microstructure also allows for thinner, more stable catalytic oxides.

Figure 2:
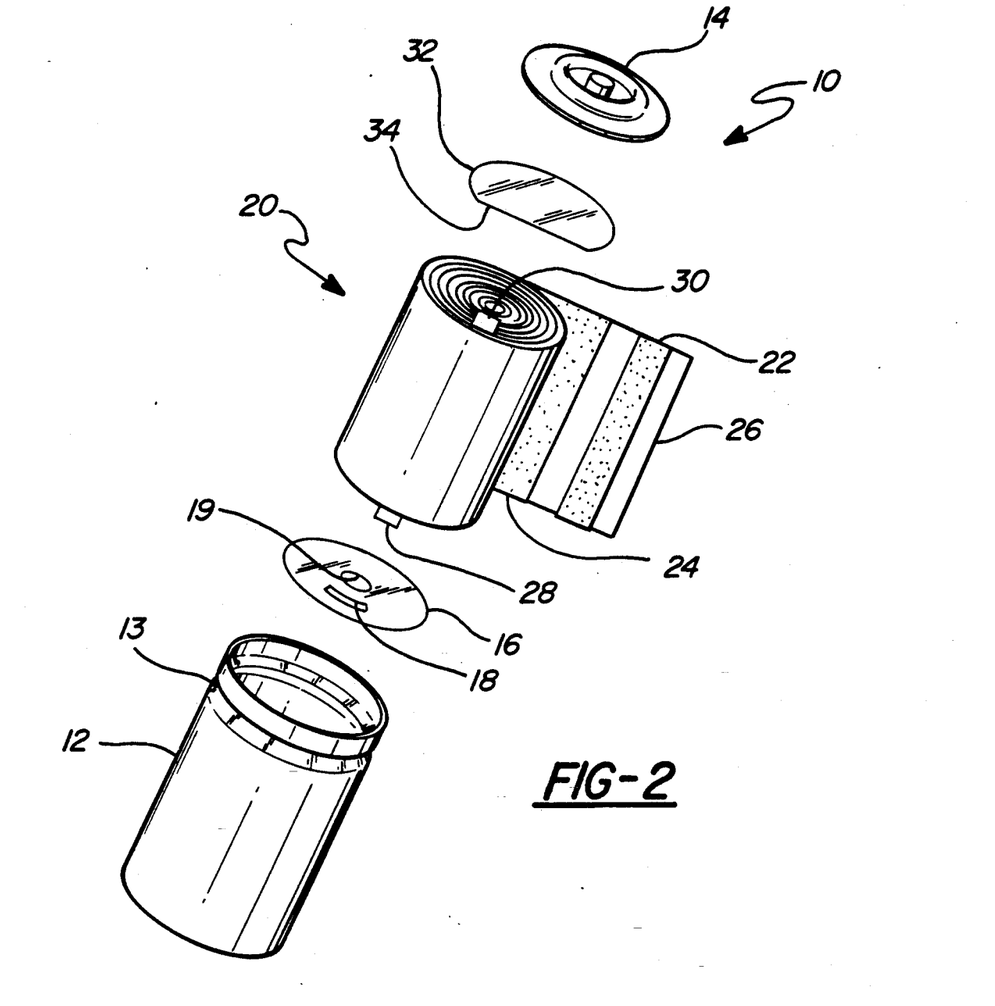
FIG. 2 is an exploded perspective view of a cylindrical, ventable electrochemical cell employing the inventive multiphase, multi-component metastable hydrogen storage alloy.

Referring now to FIG. 2, there is illustrated therein, in exploded perspective view, a cylindrical ventable electrochemical cell 10, employing the multiphase, multi-component, metastable hydrogen storage alloy material disclosed herein as the negative electrode thereof. The electrochemical cell 10 includes a cell can 12 which is typically a nickel-plated steel case in a cylindrical can configuration. The cylindrical nickel-plated steel case employed as the cell can 12 is further adapted to function as the negative terminal of the rechargeable electrochemical cell. The cell can 12 further includes a stiffened sealing lip 13 formed near the top of the cylindrical cell wall portion of said cell can. The stiffened sealing lip is adapted for supporting and sealing a cover assembly 14. Disposed inside said cylindrical can 12 is an insulator pad 16 which is adapted to substantially electrically insulate the cylindrical cell can 12 from an electrode roll 20 (described in greater detail hereinbelow) disposed therein. Specifically, the electrical insulator pad 16 is a thin insulator, as an organic, polymeric material having a cutout portion 18 so as to provide a means for allowing an electrical contact between the negative electrode and the cell can 12. In a preferred embodiment the insulator pad 16 is a 0.010" thick, type 6 nylon, and further includes a small hole 19 through the center thereof. Said hole 19 is adapted to facilitate the welding of a electrical contact tab to the cell can.

The electrochemical cell 10 further includes a positive and negative electrode isolated from one another by a separator means. Said electrodes and separator are wound into a jelly roll electrode unit 20. Jelly roll electrode unit 20 specifically comprises a negative electrode 22 which is itself the reversible multi-component, multiphase electrochemical hydrogen storage alloy comprising at least titanium, vanadium, zirconium, nickel and chromium and having the nominal composition;

$$Ti_{x'-x}Zr_xV_{y'-y}Ni_yCr_z$$

where x' is between 1.8 and 2.2, x is between 0.0 and 1.5; y' is between 3.6 and 4.4, y is between 0.6 and 3.5, and Z is an effective amount between 0.0 and 1.44.

The hydrogen storage alloy is capable of electrochemically charging and discharging hydrogen in the alkaline aqueous media, the electrolytic material discussed hereinafter, vanadium and said multi-component hydrogen storage phase normally being soluble in the alkaline, aqueous media and the chromium acting to inhibit the solubilization of vanadium into the aqueous alkaline media. This multiphase hydrogen storage alloy material is further characterized by an average grain size of one micron or less, and wherein each phase of said multiphase material has less than 50 atomic percent vanadium and chromium combined.

The jelly roll electrode unit 20 further comprises a positive electrode 24 which is typically fabricated from a nickel hydroxide material of the type commonly known in the art. Also included in the jelly roll electrode unit 20 is separator means 26 which is positioned between the negative electrode 22 and the positive electrode 24. The separator is typically felted or non-woven material such as nylon, having a thickness in the range of 0.005 and 0.020 inches. It is important to note that while nylon is a preferred separator material, other materials may be employed without departing from the spirit or scope of the invention. Whatever material is chosen as a separator 26 it is necessary that it be thick enough to prevent electrical shorting between the positive and negative electrodes 22 and 24 but not so thick so as to present problems of electrolyte transmissibility. Additionally, the separator means 26, may not be so thick as to present problems with high electrical resistance in the jelly roll electrode unit 20. The jelly roll electrode unit 20 further includes a negative electrode contact tab 26 which is attached to the negative electrode plate and is adapted to extend through the cut away section 18 of insulator pad 16 so as to affect an electrical contact with cell can 12. The jelly roll electrode unit 20 is further equipped with a positive electrode contact tab 30 which is attached to the positive electrode and is adapted to effect an electrical contact with the cover assembly 14 of the electrochemical cell.

Also disposed in the cell can 12, so as to wet and flood the jelly roll electrode unit 20, is an electrolyte material (not shown). The electrolyte is an aqueous alkaline solution, for example, a solution of distilled water containing from about 20 about 40 percent potassium hydroxide. An excess amount of electrolyte present should be present in the cell can 12 in order to assure continued operation in a vented cell environment.

Disposed atop the jelly roll electrode unit 20 inside the cell can 12 is a second electrical insulator pad 32 having a cut away portion 34 which allows the positive electrode electrical contact tab 30 to extend therethrough so as to provide electrical communication to the cell cover assembly 14 thereby making the cell cover assembly 14 the positive terminal. The electrical insulator pad 32 is similar to that discussed hereinabove in that it is typically fabricated from electrically insulating material such as an organic polymeric insulator, e.g., nylon.

The following examples are illustrative of the inventive alloys disclosed herein.

EXAMPLES

Example I

A series of $Ti_{x'-x}Zr_xV_{u'-y}Ni_yC_z$, where x' is between 1.8 and 2.2; x is between 0.0 and 1.5; y' is between 3.6 and 4.4, y is between 0.6 and 3.5 and Z is an effective amount less than 1.44 electrochemical hydrogen storage alloys were cast, and fabricated into negative electrodes for testing in sealed, alkaline cells.

Alloys having the compositions shown in Table I-1 were prepared by weighing and mixing powders of the individual metals into a graphite crucible. The crucible and its contents were placed in a vacuum furnace. The furnace was taken down to a vacuum, and then pressurized with an inert gas. The crucible contents were then melted by high frequency induction melting while under the inert gas atmosphere. The melting was carried out at a temperature of about 1500° C. for a long enough time to obtain a uniform melt. The melt was then solidified to obtain an ingot of hydrogen storage alloy. This alloy melting step is disclosed in greater detail in U.S. patent application Ser. No. 382,599 filed Jul. 21, 1988 to Fetcenko, et al.

Approximately 1 kilogram of alloy was prepared in the above manner. The ingot was broken into pieces mechanically and remelted in another graphite crucible. When molten, the alloy flowed through an orifice onto a rapidly spinning wheel. It is estimated the cooling rate was approximately $10^6$° C./minute. Ribbons of alloy were formed having a typical length of 0.25-2 inches, a typical width of about ⅛ inch and a typical thickness of about 50–55 micrometers.

It is important to note that additional, optional processing steps may be employed. For example, powders can be formed directly in the rapid solidification step by atomization, using a notched wheel, or by other means. Ribbons could be mechanically sheared and used, in pasted or pocket plate construction of other configurations. Other options are possible. The improved microstructure of the alloy is the most critical considerations. For some alloys, subsequent heat treatment steps, such as dehydriding or sintering, could be detrimental to maintaining a preferred microstructure. For example, it is possible that very disordered or even amorphous alloys could be rendered microcrystalline by these steps. The concept process history, to be custom designed for a particular alloy and a particular final application.

The ribbons of hydrogen storage alloy were then reduced in size. This was a multi-step process. The first step was a hydride/dehydride process, substantially as described in the commonly assigned, U.S. Pat. No. 4,893,756, filed Sept. 22, 1988 of Michael A. Fetcenko, Thomas Kaatz, Steven P. Sumner, and Joseph A. LaRocca, for HYDRIDE REACTOR APPARATUS FOR HYDROGEN COMMINUTION OF METAL HYDRIDE HYDROGEN STORAGE ALLOY MATERIAL, and incorporated herein by reference. In this first step the hydrogen storage alloy ingot was reduced in size to −100 mesh.

The −100 mesh hydrogen storage alloy material obtained from the hydride/dehydride process was further reduced in size by impact milling. In the high speed impact milling process used to prepare the samples for the Examples described herein, the −100 mesh hydrogen storage alloy particles were tangentially and radially accelerated against an impact block. This was substantially as described in our commonly assigned, co-pending, U.S. application Ser. No. 07/308,289 filed Feb. 9, 1989, in the names of Michael A. Fetcenko, Steven P. Sumner, Joseph LaRocca, and Thomas Kaatz, and incorporated herein by reference.

A fraction of hydrogen storage alloy material was recovered from the impact milling process. This fraction was minus 200 mesh, with a mass average particle size of about 400 mesh (38 micron)

The minus 200 mesh fraction of hydrogen storage alloy material powder was then bonded to a nickel screen current collector. Bonding was carried out by disposing a layer of the hydrogen storage alloy powder onto the current collector, and compacting the powder and current collector. Compacting was carried out under an inert atmosphere, with two compaction steps, each at a pressure of about 16 tons per square inch of current carrier. Thereafter the current collector and powder were sintered in an atmosphere of 2 atomic percent $H_2$, balance argon.

The resulting negative electrodes were trimmed to size, and wound, with polyimide separators and Ni-(OH)$_2$ positive electrodes, to form "jelly rolls". These jelly rolls were then placed in "C" size cell cans, a 30 weight percent KOH electrolyte solution was added to each cell can, and the cells were sealed to form starved, sealed "C" cells.

Each of the cells were tested under identical conditions, and under varying discharge rates. The midpoint cell voltages were recorded, and reported in Table I.

TABLE I

| Cell No. | Capacity At 0.7 A | Capacity At 2 A |
|---|---|---|
| 1 | 3.03 Ah | 2.93 Ah |
| 2 | 3.33 | 3.27 |
| 3 | 3.54 | 3.37 |
| 4 | 3.30 | 3.20 |

EXAMPLE II

Sealed cells of the type described in Examples I hereinabove underwent life cycle testing. During each cycle the cells were charged at a charge current of 1.8 Amperes to a temperature cutoff, and then discharged at a discharge rate of 2.0 Amperes to a cutoff voltage of 1.0 volts. This test mode is especially aggressive. Even with cells showing capacity loss, the addition of overcharge causes capacity to significantly increase. Thus, this example illustrates charging efficiency under cycle testing and is useful in the comparison of microstructure modifications.

Figure 3A:
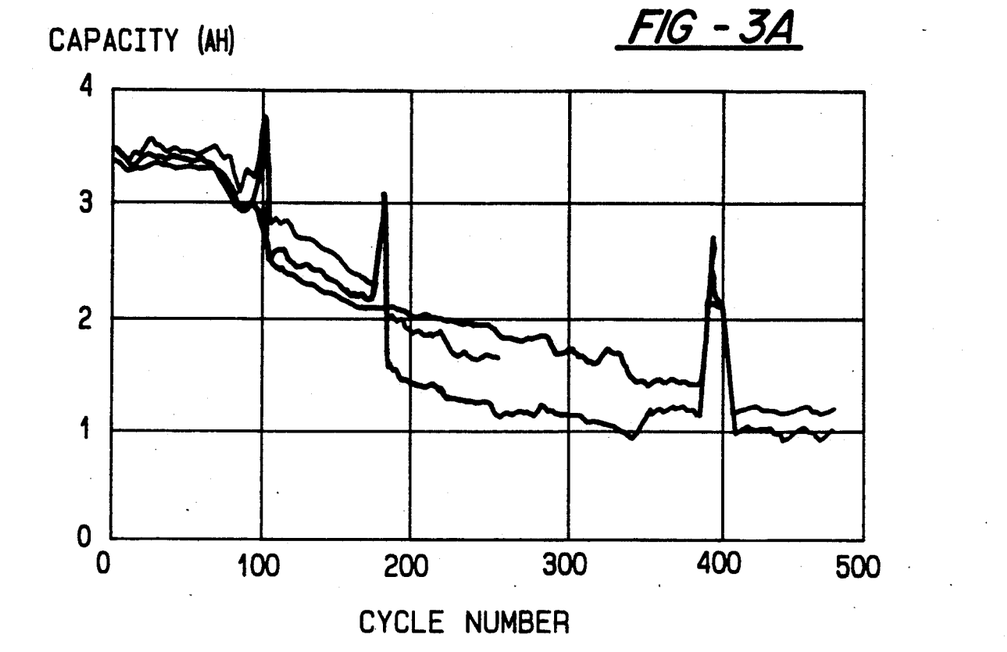
FIGS. 3a through 3d are plots of cycle life, i.e., capacity versus cycles, for sealed cells. More particularly.
Figure 3B:
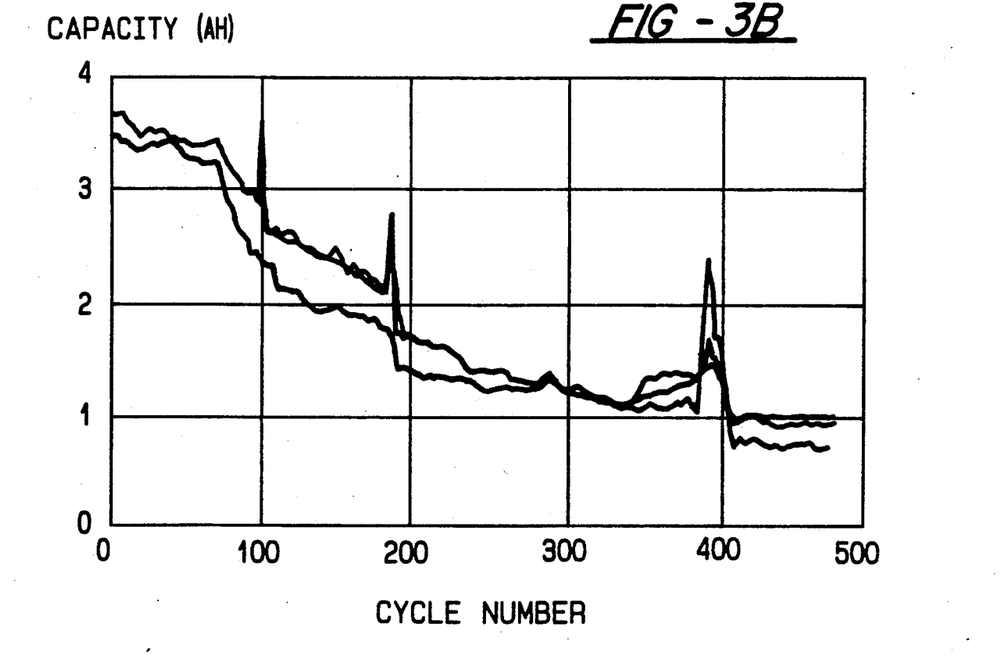
Figure 3C:
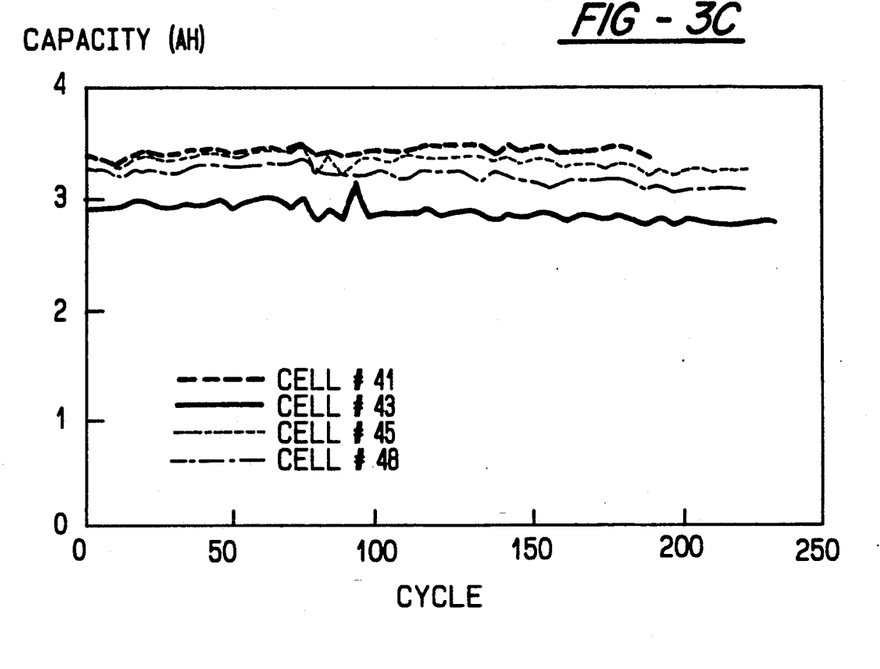
Figure 3D:
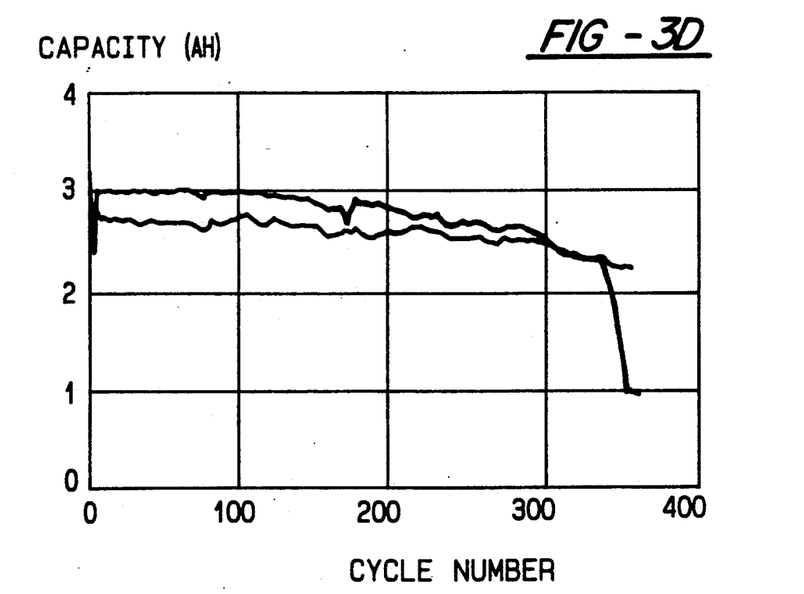

The results are reported in FIGS. 3a–3d, wherein FIGS. 3a and 3b illustrate cycle life performance for Ti-V-Ni-Zr-Cr materials fabricated by a conventional melt/cool process. The results show a significant drop-off in capacity (Ah) after only approximately 100 cycles. Conversely, FIGS. 3c and 3d illustrate life cycle performance for Ti-V-Ni-Zr-Cr materials fabricated by the rapid solidification process described herein. As can be readily appreciated from a perusal of FIGS. 3c and 3d no appreciable drop-off in capacity is observed until the cells have reached approximately 250–300 cycles.

While the invention has been described with respect to certain preferred exemplifications and embodiments, it is not intended to limit the scope of the invention thereby, but rather solely by the claims appended hereto.

We claim:

1. An improved, porous, metastable multi-component, multiphase hydrogen storage alloy material adapted for use in a rechargeable electrochemical cell, said hydrogen storage alloy material having the nominal composition:

(Vy′−yNiyTix′−xZrxCrz)

where x′ is between 1.8 and 2.2, X is between 0 and 1.5; y′ is between 3.6 and 4.4, y is between 0.6 and 3.5; and z is an effective amount between 0.0 and 1.44, said material formed by rapid solidification from a melt and wherein said material has a metastable structure characterized by an average grain size of one micron or less.

2. The improved alloy material as recited in claim 1, wherein said material has the composition $V_{22}Ti_{16}Zr_{16}Ni_{39}Cr_7$.

3. The improved alloy material as recited in claim 2, wherein the multiphase alloy has individual phases having compositions of:
 (i) V:Ti:Zr:Ni:Cr
  18.3:19.3:16.7:40.7:5.0
 (ii) V:Ti:Zr:Ni:Cr
  31.8:15.5:11.9:30.3:10.5
 (iii) V:Ti:Zr:Ni:Cr
  36.0:14.0:10.2:27.2:12.6
 (iv) V:Ti:Zr:Ni:Cr 22.9:17.3:15.6:37.3:6.8

4. The improved alloy material as recited in claim 3, wherein the predominant phase is $$V_{22.9}Ti_{17.3}Zr_{15.6}Ni_{37.3}Cr_{6.8}$$

5. The improved alloy material as recited in claim 1, wherein said material has the composition $$V_{25}Ti_{17}Zr_{16}Ni_{40}Cr_2.$$

6. The improved alloy material as recited in claim 1, wherein said material has the composition $$V_{33}Ti_{13}Zr_{14}Ni_{53}Cr_7.$$

7. The improved alloy material as recited in claim 1, wherein said material has the composition $$V_{25}Ti_{17}Zr_{16}Ni_{40}Cr_2.$$

8. The improved alloy material as recited in claim 1, wherein said material has the composition $$V_{25}Ti_{17}Zr_{15}Ni_{40}Cr_4.$$

9. The improved alloy material of claim 1, wherein said material includes a plurality of compositionally different phases and wherein no phase includes amounts of vanadium and chromium which, when added together, exceed 50 percent.

10. An improved, porous, metastable multi-component, multiphase hydrogen storage alloy material adapted for use in a rechargeable electrochemical cell, said multi-component hydrogen storage material having the nominal composition $$(V_{y'-y}Ni_yTi_{x'-x}Zr_xCr_z)$$

where $x'$ is between 1.8 and 2.2, $x$ is between 0 and 1.5; $y'$ is between 3.6 and 4.4, $y$ is between 0.6 and 3.5; and $z$ is an effective amount between 0.0 and 1.44, which material is formed by rapid solidification from a melt and wherein the multiphase material has a refined grain size, a relatively disordered microstructure and is characterized by each phase of said material comprising less than 50 atomic percent vanadium and chromium combined.

11. The improved alloy material as recited in claim 10, wherein the multiphase alloy has individual phases having compositions of:
 (i) V:Ti:Zr:Ni:Cr
  18.3:19.3:16.7:40.7:5.0
 (ii) V:Ti:Zr:Ni:Cr
  31.8:15.5:11.9:30.3:10.5
 (iii) V:Ti:Zr:Ni:Cr
  3.60:14.0:10.2:27.2:12.6
 (iv) V:Ti:Zr:Ni:Cr
  22.9:17.3:15.6:37.3:6.8

12. The improved alloy material as recited in claim 11, wherein the predominant phase is:

$$V_{22.9}Ti_{17.3}Zr_{15.6}Ni_{37.3}(Cr_{6.8}$$

13. The improved alloy material as recited in claim 10, wherein said material has the composition $$V_{22}Ti_{16}Zr_{16}Ni_{39}Cr_7.$$

14. The improved alloy material as recited in claim 10, wherein said material has the composition $$V_{25}Ti_{17}Zr_{16}Ni_{40}Cr_2.$$

15. The improved alloy material as recited in claim 10, wherein said material has the composition $$V_{33}Ti_{13}Zr_{14}Ni_{53}Cr_7.$$

16. The improved alloy material as recited in claim 10, wherein said material has the composition $$V_{25}Ti_{17}Zr_{16}Ni_{40}Cr_2.$$

17. The improved alloy material as recited in claim 10, wherein said material has the composition $$V_{25}Ti_{17}Zr_{15}Ni_{40}Cr_4.$$

18. The improved alloy material as recited in claim 10, wherein said material is a metastable polycrystalline material.

19. The improved alloy material as recited in claim 10, wherein said material demonstrates improved grain boundaries to inhibit alloy corrosion.

20. The improved alloy material of claim 10, wherein said material includes a plurality of compositionally different phases and wherein no phase includes amounts of vanadium and chromium which, when added together, exceed 50 percent.

21. The improved alloy material as recited in claim 10, wherein the grain size of said polycrystalline material is less than about 10 micron size.

22. The improved alloy material as recited in claim 21, wherein the grain of said material is less than about 1 micron size.

* * * * *

UNITED STATES PATENT AND TRADEMARK OFFICE
CERTIFICATE OF CORRECTION

PATENT NO. : 5,135,589

DATED : August 4, 1992

INVENTOR(S) : Fetcenko et al.

It is certified that error appears in the above-identified patent and that said Letters Patent is hereby corrected as shown below:

Title page, item [73], Assignee; insert --Energy Conversion Devices, Inc., Troy, Michigan--.

In column 1, line 41, replace "M + $H_2O$ + - M-H + $OH^-$ (Charging)" with --M + $H_2O$ + $e^-$ M-H + $OH^-$ (Charging)--.

In column 7, line 12, replace "base" with --phase--.

In column 10, line 42, replace "$_u$." with --$_y$.--.

In column 14, line 4, replace "3.60:" with --36.0:--.

In column 14, line 10, after "$Ni_{37.3}$" remove "(".

Signed and Sealed this

Twenty-fourth Day of August, 1993

Attest:

BRUCE LEHMAN

Attesting Officer

Commissioner of Patents and Trademarks